UNITED STATES PATENT OFFICE.

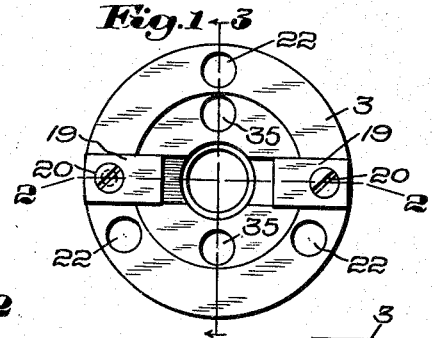
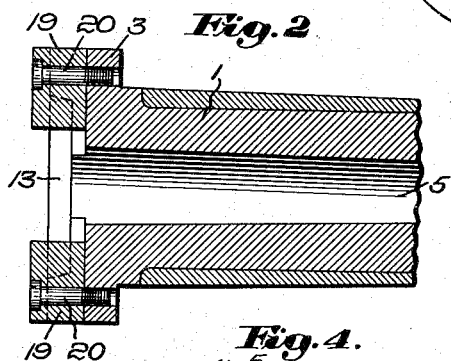
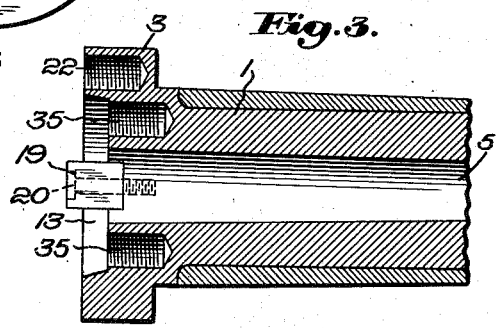
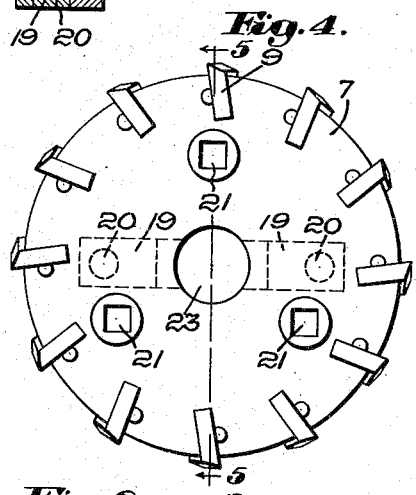
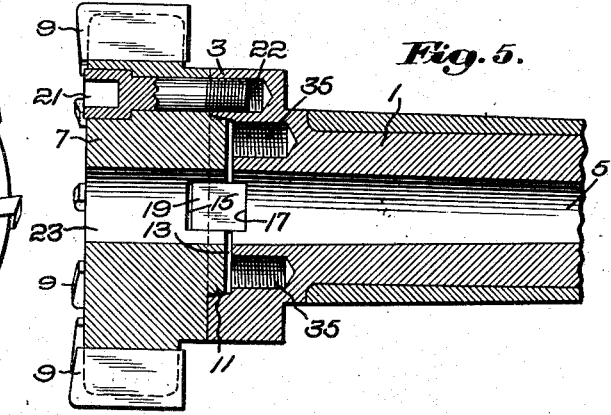
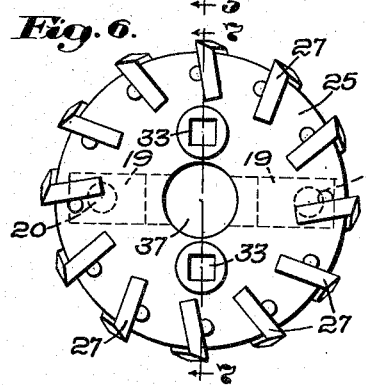
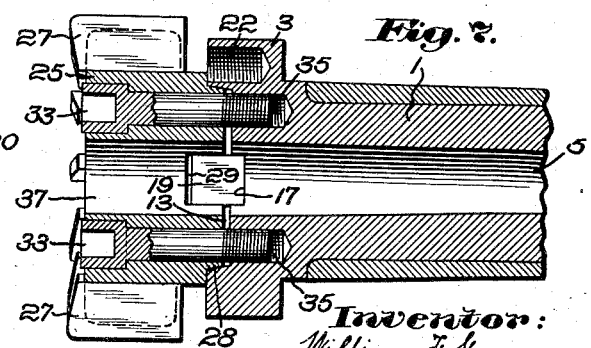

WILLIAM F. GROENE, OF CINCINNATI, OHIO, ASSIGNOR TO THE R. K. LE BLOND MACHINE TOOL COMPANY, OF CINCINNATI, OHIO, A CORPORATION OF OHIO.

MEANS FOR ATTACHING TOOLS TO SPINDLES.

1,300,163.　　　　　Specification of Letters Patent.　　Patented Apr. 8, 1919.

Application filed August 16, 1917.　Serial No. 186,626.

*To all whom it may concern:*

Be it known that I, WILLIAM F. GROENE, a citizen of the United States, residing at Cincinnati, county of Hamilton, and State of Ohio, have invented an Improvement in Means for Attaching Tools to Spindles, of which the following description, in connection with the accompanying drawings, is a specification, like characters on the drawings representing like parts.

The invention hereinafter described relates to spindles for machine tools.

It is necessary to connect to the end of the spindle, cutters and other tools of different sizes according to the character of the work operated upon. The cutters usually have blades circumferentially disposed thereon and a central bore to receive the arbor which is driven into the tapered bore of the spindle. As a consequence, the space intermediate the blades and the bore to receive the means for attaching the cutter to the spindle is very limited.

One object of the present invention is to provide a spindle nose with simple and effective attaching means, whereby both large cutters and smaller cutters than heretofore used may be secured to the spindle nose in the space between the cutter blades and the central bore of the spindle.

And another object is to provide simple and effective means for centering the cutter and driving means for transmitting rotation from the spindle to the cutter without strain on the attaching means.

The character of the invention may be best understood by the following description of one good form thereof shown in the accompanying drawing, wherein:—

Figure 1 is a face view of a spindle nose embodying the present invention;

Fig. 2 is a horizontal section taken on the line 2—2 of Fig. 1;

Fig. 3 is a vertical section taken on the line 3—3 of Fig. 1;

Fig. 4 is a face view of a large cutter attached to the spindle;

Fig. 5 is a vertical section taken on the line 5—5 of Fig. 4.

Fig. 6 is a face view of a small cutter attached to the spindle; and

Fig. 7 is a vertical section taken on the line 7—7 of Fig. 6.

Referring to the drawing: 1 designates a portion of a spindle having a flange or head 3 and a tapered bore 5 adapted to receive the usual arbor.

The large cutter shown in Figs. 4 and 5 comprises a body 7 having notches in the periphery thereof receiving cutting blades 9. To position the cutter in axial alinement with the spindle, the former may have a projection 11 on the rear face thereof fitting a recess 13 in the spindle head. To transmit rotation from the spindle to the cutter, they may have opposed grooves 15 and 17 therein adapted to receive drivers or keys 19 secured to the spindle by screws 20.

To secure the cutter to the spindle, attaching means is provided, in the present instance of the invention, in the form of screws 21 entered through smooth bores in the body of the cutter and threaded into bores 22 registering therewith in the spindle head adjacent the periphery thereof.

These attaching screws must be located radially inward from the blades and outward from the bore 23 in the cutter, registering with the spindle bore for the arbor, referred to. However, it is desirable to have the attaching screws radially outward as close to the blades as possible, in order to secure the cutter to the spindle with mechanical advantage.

The small cutter shown in Figs. 6 and 7 comprises a body 25 having notches in the periphery thereof receiving cutting blades 27. The body of the cutter has a projection 28 on the rear face thereof fitting into the recess 13, referred to and coöperating therewith to appropriately aline the cutter axially of the spindle.

To transmit rotation from the spindle to the cutter, the former may have grooves 29 therein adapted to receive the drivers 19 referred to.

To secure the cutter to the spindle, attaching means is provided, in the present instance of the invention, in the form of screws 33, entered through bores in the body of the cutter and threaded into registering bores 35 in the spindle.

Here again, the attaching screws must be located radially inward from the blades of the cutter and outward from the bore 37 of the cutter; but it will be noted that the screw holes 35 are radially inward from the screw holes 22 for the large cutter and in the present instance of the invention, the screw holes 35 are radially within the alining recess 13 referred-to.

The construction is such that the attaching means, such as the screws, for the small cutter may be located nearer the axis of the spindle than heretofore, and since these screws limit the reduction in the size of the cutter, the construction described permits smaller cutters to be used than formerly were possible.

It will be observed that the recess and drivers of the spindle serve both large and small cutters, and that by the addition of the inner screw holes 35, provision is made for the employment of smaller cutters than heretofore possible.

By my invention, the spindle is provided with simple and effective means whereby large and small cutters may be secured alternatively to the spindle, as desired.

In the preferred form of the invention the walls of the projection 11 on the rear face of the cutters and the walls of the receiving recess 13 in the spindle head are made tapering, as shown, thereby eliminating the wear that would be incidental to the change of cutters where the close or snug fit required with straight side walls is employed.

To connect the cutter to the spindle, it is merely necessary to present the cutter to the spindle with the projection on the rear face thereof entering the spindle recess and the drivers entering the grooves in the rear face of the cutter. When the drivers enter said grooves, the screw holes of the cutter and spindle will be located in proper registration, and then it is merely necessary to tighten the screws to complete the attachment of the cutter to the spindle. The large cutter may be removed with equal ease and the small cutter attached to the spindle in the same manner as described for the large cutter.

It will be understood that the invention is not limited to the specific embodiment shown, but that various deviations may be made therefrom without departing from the spirit and scope of the appended claims.

What is claimed is:—

1. The combination of a spindle for machine tools having an arbor receiving bore and a head, a tool having an arbor receiving bore and cutting blades, a tapered portion and a correspondingly tapered recess on the spindle and tool to center the tool and spindle, driving elements on the spindle and tool for positive engagement that the spindle may positively drive the tool, said spindle head having a plural set of holes at different radial distances from the axis of the spindle adapted to receive fastenings for securing different sized cutters to said spindle at points radially within the cutting blades, and fastenings for securing the tool to the head of the spindle.

2. The combination of a spindle having a centering recess provided with tapering walls, a cutter having knives and a centering projection having tapering walls to engage the centering recess of the spindle, interengaging driving elements on the cutter and spindle, said spindle having plural sets of securing holes at different radial distances from the axis of the spindle adapted to receive fastenings for securing different sized cutters to said spindle at points radially within the knives of the cutters, one set of said securing holes on the spindle being arranged radially beyond the centering recess and another set radially within the centering recess.

3. The combination with a spindle for machine tools, of a rotary cutter mounted on said spindle having a body with knives thereon, driving elements on said spindle and cutter for positive engagement, that said spindle may positively drive said cutter, said spindle having plural sets of screw holes at different radial distances from the axis of said spindle adapted to receive screws for securing different sized cutters to said spindle at points radially within the knives of the cutters, and screws for insertion in said sets of screw holes for securing the cutters to said spindle.

4. The combination with a spindle for machine tools having an end flange, and a tapered bore for receiving a tapered arbor, a tool mounted on said spindle and provided with knives, said spindle and tool having a portion on one adapted to seat in a recess in the other to center said tool with respect to said spindle, said flange and tool having driving elements for positive engagement, that said tool may be positively driven from said flange and securing means between the flange and tool, comprising plural sets of screw holes in one at different radial distances from the axis of the spindle adapted to receive screws from the other for securing different sized tools to said spindle at points radially within the knives of the tool.

In testimony whereof, I have signed my name to this specification.

WILLIAM F. GROENE.